March 28, 1967 R. O. TITUS 3,310,910
CAST PLANTER

Filed Jan. 4, 1965 2 Sheets-Sheet 1

INVENTOR.
REAN OTIS TITUS
BY
ATTORNEYS

INVENTOR.
REAN OTIS TITUS
ATTORNEYS

United States Patent Office 3,310,910
Patented Mar. 28, 1967

3,310,910
CAST PLANTER
Rean Otis Titus, 4436 Mount Elliott Ave.,
Detroit, Mich. 48207
Filed Jan. 4, 1965, Ser. No. 423,142
4 Claims. (Cl. 47—33)

The invention relates to landscaping and refers more specifically to a planter for providing a terraced garden.

In the past gardens have often been planted on flat ground so that it was required to place shorter plants on the outside of a planting area in order that they would not be hidden by taller plants. Where plants of the same height have been planted on flat ground the full effect of the plants has not been realized since a large portion of them have been hidden from view by the outer plants.

Where terraced planters have been provided before the planters have been deficient in many respects. For example, with prior terraced planters no provision has been made for anchoring the planters in a predetermined location or for easy and permanent alignment of the various members of the planters. In addition, with prior planters poor communication with the ground on which the planters have been positioned has been provided and the individual areas of the planters have lacked communication therebetween so that individual watering and soil conditionings has been necessary.

It is therefore a purpose of the present invention to provide an improved planter.

Another object is to provide a planter characterized by a flat base and a plurality of concentric members defining planting areas therebetween positioned on the base which members are progressively shorter as they are larger in dimension.

Another object is to provide a planter as set forth above wherein the base has a central opening therein and the center concentric member is received in the opening in the base.

Another object is to provide a planter as set forth above wherein the center concentric member extends below the base through the opening therein.

Another object is to provide a planter as set forth above wherein a plurality of concentric aligning ribs are provided on the upper surface of the base for aligning the concentric members on the base of the planter.

Another object is to provide a planter as set forth above wherein the aligning ribs are provided on both 'sides of the base and also serve to anchor the base in a predetermined position with the planter in use.

Another object is to provide a planter as set forth above wherein openings are provided extending through the base in communication with each of the spaces between the concentric members.

Another object is to provide a planter as set forth above wherein the concentric members are provided with transversely extending openings therethrough positioned below the top of the next lower concentric member for lateral transfer of fluid materials in said planter.

Another object is to provide a planter which is simple in construction, economical to manufacture and efficient in use.

Other objects and features of the invention will become apparent as the description proceeds, especially when taken in conjunction with the accompanying drawings, illustrating a preferred embodiment of the invention, wherein.

With particular reference to the figures of the drawings, one embodiment of the present invention will now be considered in detail.

Figure 1:
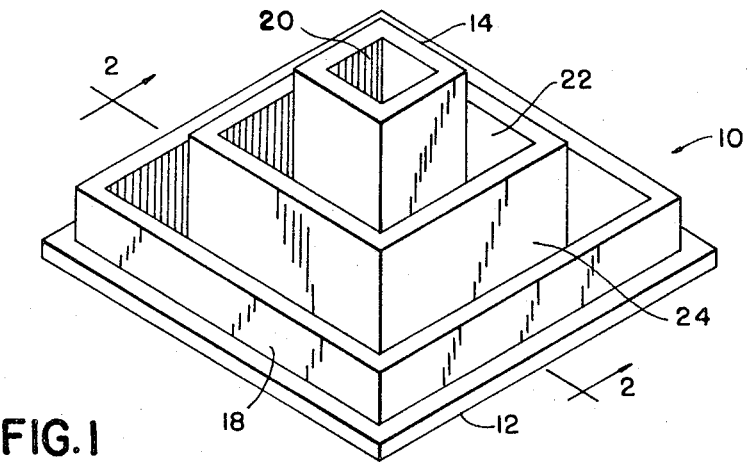
FIGURE 1 is a perspective view of a terraced planter constructed in accordance with the invention.

As shown best in FIGURE 1, the terraced planter 10 includes a base 12 having a plurality of concentric rectangular members 14, 16 and 18 positioned thereon. Each of the concentric members starting with the central concentric member 14 and ending with the outer concentric member 18 are progressively shorter than the next inner concentric member.

Thus, in use, with the base 12 positioned on a flat surface, such as a lawn, and with the spaces 20, 22 and 24 filled with soil, a terraced garden may be planted. The terraced planter 10 thus permits planting of shorter flowers toward the center of a garden whereby greater latitude of design and color arrangement is permitted than would be permitted in a flat garden and the beauty of the central portion of a garden is not lost to view behind the edges thereof.

Figure 3:
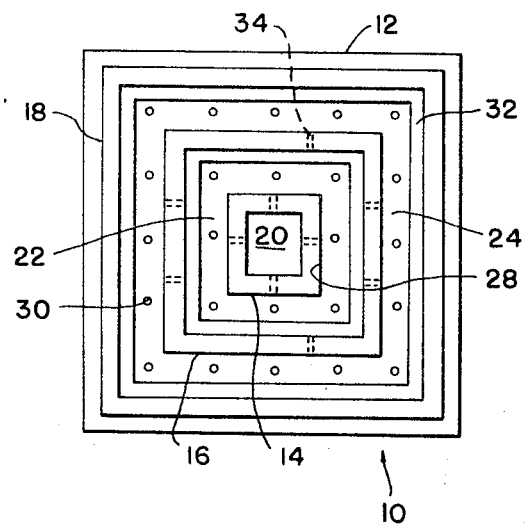
FIGURE 3 is a top view of the planter illustrated in FIGURE 1.

More specifically, the base 12, as illustrated in FIGURES 1 and 3, is rectangular and may be constructed of castable material, such as concrete. Reinforcing members 26 may be provided in the base 12 as necessary for strength requirements in accordance with well known reinforced concrete design principles.

A central opening 28 is provided in the base 12 through which the center concentric member 14 extends. The opening 28 thus centrally positions the center concentric member 14 with respect to the base 12 and permits ready communication of the center concentric member 14 with the ground on which the base 12 is positioned. Plants positioned in the space 20 defined by the center concentric member 14 may thus draw nourishment directly from the ground on which the planter is positioned and drainage is provided directly into the ground.

Base 20 is further provided with openings 30 extending therethrough and communicating between the ground below the base 12 and the spaces 22 and 24 between the concentric members 14 and 16 and members 16 and 18. Thus drainage from the spaces 22 and 24 into the ground if the planter is provided with too much moisture is possible and conversely if necessary the planter can draw some moisture from the ground through the openings 30.

Figure 2:
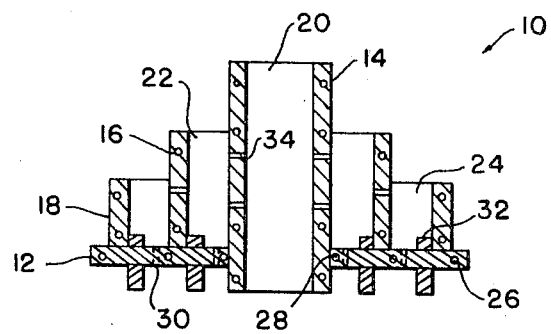
FIGURE 2 is a section view of the planter illustrated in FIGURE 1 taken substantially on the line 2—2 in FIGURE 1.

Rectangular ribs 32 are provided on the top and bottom of the base 12, as best shown in FIGURE 2. The ribs are of a dimension slightly smaller than the dimension of the concentric members 14, 16 and 18. The ribs 32 on the top of the base 12 are thus used to align the concentric members 16 and 18 on the base 12 concentric with the central concentric member 14. The ribs 32 on the bottom of the base 12 further serve to anchor the base 12 in a predetermined position in the ground on which the base 12 is placed. The ribs 32 on the base 12 thus have a double function and will permit installation of the base 12 with either side up.

The individual concentric members 14, 16 and 18 are generally rectangular in shape, as shown best in FIGURE 3, and as previously indicated are progressively shorter outwardly of the base 12. The concentric members 14 may be constructed of cast reinforced concrete similar to that of the base 12.

The transverse openings 34 extending through the walls of the concentric members 14 and 16 permit transfer of moisture, fluid plant food and the like outwardly through the soil in the spaces 22 and 24 between the concentric members 14, 16 and 18. It will be noted that the transverse openings 34 through the center concentric member 14 are positioned centrally thereof so that with the bottom of the center concentric member 14 extending through the opening 28, the transverse openings 34 are below the top of the concentric member 16 whereby transfer of fluid from space 20 to space 22 may be effected without objectionable discoloration of the viewable portion of the member 14 and without the necessity of determining which end of the member 14 is the top or bottom. Similarly, since the outer concentric member 18 is made slightly higher than half the height of the concentric member 16, the opening 34 through the concentric member 16 may be centrally positioned to effect ready transfer of fluids therethrough and it is not required to determine the top or bottom of any of the elements of the planter 10 during installation.

While it has been indicated that the planter is constructed of cast reinforced concrete, non-reinforced concrete could likewise be used as could a number of other materials, such as plastics or metals. The materials should of course be relatively non-reactive with the ground and gardening chemicals.

The planter 10 may be constructed at the site of use. However, preferably the separate base and concentric members are manufactured separately and shipped to the point of use where they are assembled and the spaces 20, 22 and 24 filled with soil for planting purposes.

Figure 4:
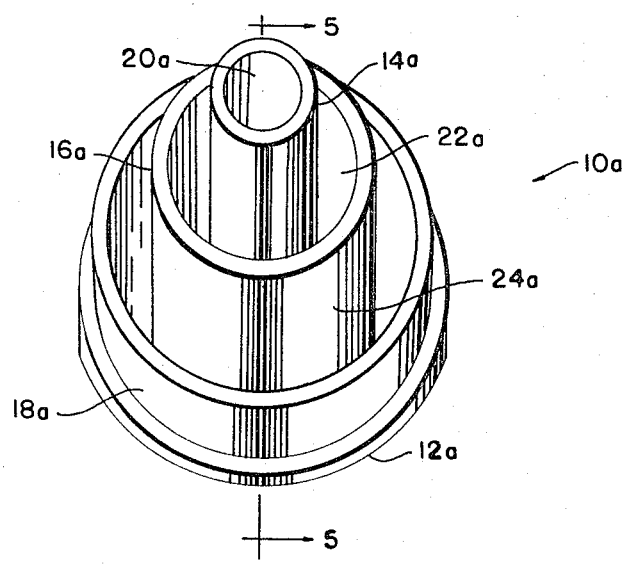
FIGURE 4 is a perspective view of a modification of the planter structure illustrated in FIGURE 1.
Figure 5:
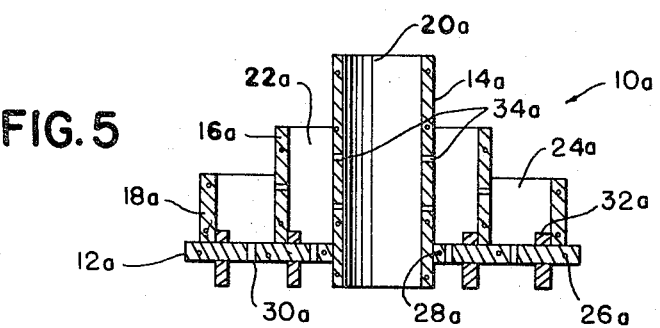
FIGURE 5 is a section view of the modified planter illustrated in FIGURE 4 taken substantially on the line 5—5 in FIGURE 4.
Figure 6:
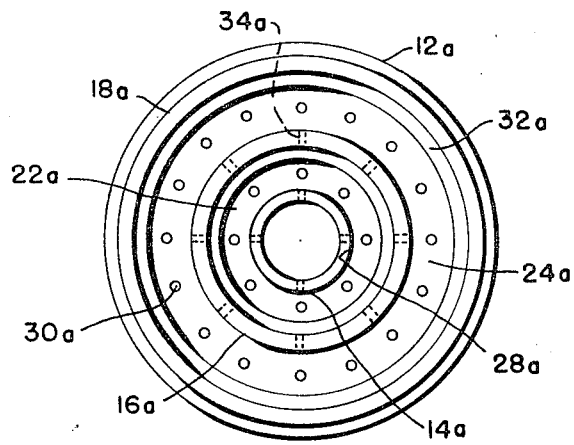
FIGURE 6 is a top view of the modified planter structure illustrated in FIGURE 4.

The modified planter 10A illustrated in FIGURES 4–6 is entirely similar to the planter 10 illustrated in FIGURES 1–3. The difference between the planters 10 and 10A is that the base 12A and concentric members 14A, 16A and 18A are circular instead of rectangular, as best shown in FIGURE 6. The modified planter structure 10A, illustrated in FIGURES 4–6, in which reference characters the same as those used in consideration of the planter 10, followed by the suffix "a" have been used, will not therefore be separately considered in detail.

While one embodiment of the present invention and a modification thereof have been disclosed in detail, it will be understood that other embodiments and modifications of the invention are contemplated. For example, other geometric figures could form the base and the concentric members of the planters illustrated and a plurality of different ornamental designs, monograms, and the like could be placed on the exposed portions of the concentric members of the planters. It is the intention to include all embodiments and modifications of the invention as are defined by the appended claims within the scope of the invention.

What I claim as my invention is:

1. A planter comprising a flat base having a central opening therethrough, a plurality of spaced apart members positioned on said base and concentric with respect to said opening through said base, each of which is shorter than the next inner member, and a central member concentric with and spaced apart from said other members, the lower end of which is received in the opening through the base and the upper end of which extends above the adjacent one of said plurality of members.

2. Structure as set forth in claim 1 wherein the lower end of the central member extends below the bottom of the base.

3. Structure as set forth in claim 1 and further including a plurality of concentric ribs on the top and bottom of the base for aligning the concentric members and anchoring the base in position.

4. Structure as set forth in claim 1 and further including openings extending through the base between the concentric members and openings extending through the inner concentric members for providing drainage between the concentric members.

References Cited by the Examiner
UNITED STATES PATENTS

| | | | |
|---|---|---|---|
| 400,736 | 4/1889 | Blake et al. | 210—283 |
| 1,140,726 | 5/1915 | Warden | 210—338 |
| 2,651,143 | 9/1953 | Esmay et al. | 47—34.12 X |

FOREIGN PATENTS

| | | |
|---|---|---|
| 577,276 | 9/1924 | France. |
| 453,616 | 12/1927 | Germany. |
| 403,460 | 12/1933 | Great Britain. |
| 957,455 | 5/1964 | Great Britain. |
| 69,433 | 7/1915 | Switzerland. |

ABRAHAM G. STONE, *Primary Examiner.*

J. R. OAKS, *Assistant Examiner.*